US009009537B2

(12) United States Patent
Addison et al.

(10) Patent No.: US 9,009,537 B2
(45) Date of Patent: Apr. 14, 2015

(54) DIAGNOSTIC DATA CAPTURE IN A COMPUTING ENVIRONMENT (75) Inventors: Edward A. Addison, Raleigh, NC (US); Philip R. Lee, Winchester (GB); Roger G. Lewis, Southampton (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/635,260

(22) PCT Filed: Mar. 15, 2011

(86) PCT No.: PCT/EP2011/053886
§ 371 (c)(1),
(2), (4) Date: Sep. 14, 2012

(87) PCT Pub. No.: WO2011/113828
PCT Pub. Date: Sep. 22, 2011

(65) Prior Publication Data
US 2013/0013963 A1  Jan. 10, 2013

(30) Foreign Application Priority Data
Mar. 16, 2010 (EP) .................................. 10156667

(51) Int. Cl.
G06F 11/00 (2006.01)
G06F 11/07 (2006.01)
G06F 11/30 (2006.01)

(52) U.S. Cl.
CPC ........ *G06F 11/0781* (2013.01); *G06F 11/0715* (2013.01); *G06F 11/0754* (2013.01); *G06F 11/3055* (2013.01)

(58) Field of Classification Search
CPC .......................... G06F 11/3664; G06F 11/3636

USPC ........................................................ 714/38.1
See application file for complete search history.

(56) References Cited

U.S. PATENT DOCUMENTS 4,371,930 A     2/1983   Kim
6,018,300 A *   1/2000   Dowden et al. ............... 340/635
(Continued)

FOREIGN PATENT DOCUMENTS

CN    101226495 A    7/2008
JP    10512109       11/1998
JP    10512109 A     11/1998

OTHER PUBLICATIONS

International Search Report for International Application No. PCT/EP2011/053886; International Filing Date: Mar. 15, 2011; 4 pages.
(Continued)

*Primary Examiner* — Philip Guyton
(74) *Attorney, Agent, or Firm* — Cantor Colburn LLP; Prentiss Johnson (57) ABSTRACT

A multithreaded computing environment for capturing diagnostic data includes initiating a trap delay component having a delay threshold in response to a monitor determining that the computing environment is in a predetermined invalid state. The multithreaded computing environment for capturing diagnostic data also includes recording, by a first thread, diagnostic data for the computing environment. The trap delay component delays the step of recording diagnostic data until the monitor determines that the predetermined invalid state has been repeated for at least one of a total count or a period corresponding to a predetermined indicator that it is a state other than a transient state of the computing environment. The transient state corresponds to a transition of the computing environment by one or more other threads from a first valid state to a second valid state.

17 Claims, 4 Drawing Sheets

(56) References Cited

U.S. PATENT DOCUMENTS

| | | |
|---|---|---|
| 7,165,190 B1 | 1/2007 | Srivastava et al. |
| 7,395,458 B2 * | 7/2008 | Shrivastava et al. ......... 714/47.2 |
| 2005/0246590 A1 | 11/2005 | Lancaster |
| 2006/0095812 A1 | 5/2006 | Gerard et al. |
| 2006/0200823 A1 | 9/2006 | Rodeheffer et al. |
| 2006/0294347 A1 | 12/2006 | Zou et al. |
| 2011/0072310 A1 | 3/2011 | Lee et al. |
| 2013/0013963 A1 * | 1/2013 | Addison et al. ................. 714/45 |

OTHER PUBLICATIONS

Hirano et al., "Realization of Reliability and Performance required Mission Critical System", UNISYS Technology Review, Nihon Unisys Ltd., No. 75, dated Nov. 30, 2002, 13 pages. (English Abstract Included on p. 2).

Hirano et al., "Realization of Reliability and Performance required Mission Critical System", UNISYS Technology Review, Nihon Unisys Ltd., No. 75, dated Nov. 30, 2002, p. 42-53 (English Abstract Included).

\* cited by examiner

DIAGNOSTIC DATA CAPTURE IN A COMPUTING ENVIRONMENT

CROSS REFERENCE TO RELATED APPLICATION

This is a U.S. national stage of application No. PCT/EP2011/053886, filed on Mar. 15, 2011; priority under 35 U.S.C. §119(a) and 35 U.S.C. §365(b) is claimed from European Patent Application No. 10156667.7, filed Mar. 16, 2010, and all the benefits accruing therefrom under 35 U.S.C. §119, the contents of which in its entirety are herein incorporated by reference.

BACKGROUND

The present invention relates to diagnostic data capture in a computer environment upon determination of an invalid state. In particular it relates to a verification of the invalid state.

Multithreaded computing environments are capable of executing multiple threads of executing software at the same time. Such environments can involve one or more computer systems including multiple processors or single processors capable of executing multiple instructions contemporaneously.

Problem determination and resolution in such environments draws upon software and hardware tools to assist in diagnosis. Typically, there is the ability to record information about the flow of events through software code in the computing environment. For example, in IBM CICS products, a facility is provided known as "CICS Trace" (IBM and CICS are registered trademarks of International Business Machines Corporation in the United States, other countries, or both). It allows a chronological sequence of events to be captured as a thread of execution moves through different software programs in a computing environment.

Sometimes there is a need to capture problem determination diagnostics when a particular event (or sequence of events) has taken place, where the existing diagnostic data provided in a trace is insufficient to resolve a particular problem. Monitoring and diagnostic logic can be implemented in software to monitor the state of the computing environment and capture diagnostic data when the state is determined to indicate an unstable, ineffective or erroneous state of operation. Such states can be known as invalid states of execution. In the example of CICS, this can be achieved using a program known as "DFHTRAP" which can analyse the state of a computing environment at specific points in its execution and make decisions as to whether diagnostic data should be captured depending upon the state of the environment at those points in time.

In computing environments implemented to execute in a single-threaded manner, where only a single series of logical operations can execute one time, the monitoring and diagnostic logic which analyses the state of the environment can be certain that the state is static at the time it is being analysed. This means that if an invalid state is detected it represents an instance of failure and so it is correct to capture diagnostic data for it.

However, in multithreaded computing environments such as CICS Transaction Server with multiple open task control blocks (TCBs), there is the potential for the state of the computing environment to change while the environment is being monitored. Such changes of state can take place because threads of execution other than a monitoring and diagnostic thread continue to execute and potentially change the state of the computing environment at the same time as the monitoring operation. This can lead to the environment appearing to be in an invalid state when in fact it is the result of another thread changing the state of the environment at that same moment in time.

Operations that can be problematic in multithreaded computing environments include, for example: the addition or removal of list items to/from a linked list data structure; the updating of instance data; the incrementing or decrementing of counters (such as above or below thresholds); etc. Such operations do not ultimately result in an invalid state of the computing environment but can involve transitioning through a transient state that can be seen to be invalid if not understood in the context of the overall operation. For example, the addition of an item to a linked list data structure can, momentarily, result in a newly created list item containing uninitialized (and consequently invalid) memory references (pointers). Monitoring and diagnostic logic analysing such data could conclude an invalid state due to the invalid memory reference when in fact the state is merely transient and, when considered as part of the overall operation of adding a new linked list item, the operation will conclude with a valid list item entry with no invalid memory references. Similarly, the incrementing of a counter which causes the counter to exceed a predetermined threshold can, momentarily, result in a determination of an invalid state by monitoring and diagnostic logic since the threshold is exceeded. In fact the state is merely transient and, when considered as part of the overall operation of incrementing a counter and checking for the breach of a threshold before resetting the counter, the operation will conclude with a valid state. Accordingly, false positive determinations of invalid state by monitoring and diagnostic logic can arise in multithreaded computing environments and can result in the unnecessary collection of diagnostic data.

In a busy production environment, such as an online transaction processing environment like CICS, the capturing of unnecessary diagnostic data can result in a major degradation of performance. The obvious solution is to synchronise the computing environment during the monitoring and diagnostic operation such as by forcing the environment to suspend all threads other than the monitoring and diagnostic thread while the monitoring and diagnostic logic executes. Such synchronisation imposes unfeasible performance bottlenecks on the computing environment as all threads are suspended every time monitoring takes place, resulting in poor performance.

Accordingly, it is presently not possible to capture diagnostic data for invalid states of a computing environment without the potential to also capture diagnostic data due to valid transient changes in the environment's state, and so incur a performance degradation arising from the unnecessary collection of diagnostic data.

SUMMARY

The present invention accordingly provides a method in a multithreaded computing environment for capturing diagnostic data. The method includes initiating a trap delay component having a delay threshold in response to a monitor determining that the computing environment is in a predetermined invalid state. The method also includes recording, by a first thread, diagnostic data for the computing environment. The trap delay component delays the step of recording diagnostic data until the monitor determines that the predetermined invalid state has been repeated for at least one of a total count or a period corresponding to a predetermined indicator that it is a state other than a transient state of the computing environment. The transient state corresponds to a transition of the computing environment by one or more other threads from a first valid state to a second valid state.

The present invention accordingly also includes an apparatus in a multithreaded computing environment for capturing diagnostic data. The apparatus includes means for initiating a trap delay component having a delay threshold responsive to a monitor determining that the computing environment is in a predetermined invalid state. The apparatus also includes means for recording, by a first thread, diagnostic data for the computing environment. The trap delay component delays operation of the means for recording diagnostic data until the monitor determines that the predetermined invalid state has been repeated for at least one of a total count or a period corresponding to a predetermined indicator that it is a state other than a transient state of the computing environment. The transient state corresponding to a transition of the computing environment by one or more other threads from a first valid state to a second valid state.

The present invention accordingly also includes a computer program product including computer program code to, when loaded into a computer system and executed thereon, cause the computer to perform the steps of a method. The method includes initiating a trap delay component having a delay threshold in response to a monitor determining that the computing environment is in a predetermined invalid state. The method also includes recording, by a first thread, diagnostic data for the computing environment. The trap delay component delays the step of recording diagnostic data until the monitor determines that the predetermined invalid state has been repeated for at least one of a total count or a period corresponding to a predetermined indicator that it is a state other than a transient state of the computing environment. The transient state corresponds to a transition of the computing environment by one or more other threads from a first valid state to a second valid state.

BRIEF DESCRIPTION OF THE DRAWINGS

A preferred embodiment of the present invention is described below in more detail, by way of example only, with reference to the accompanying drawings, in which.

DETAILED DESCRIPTION

Figure 1:
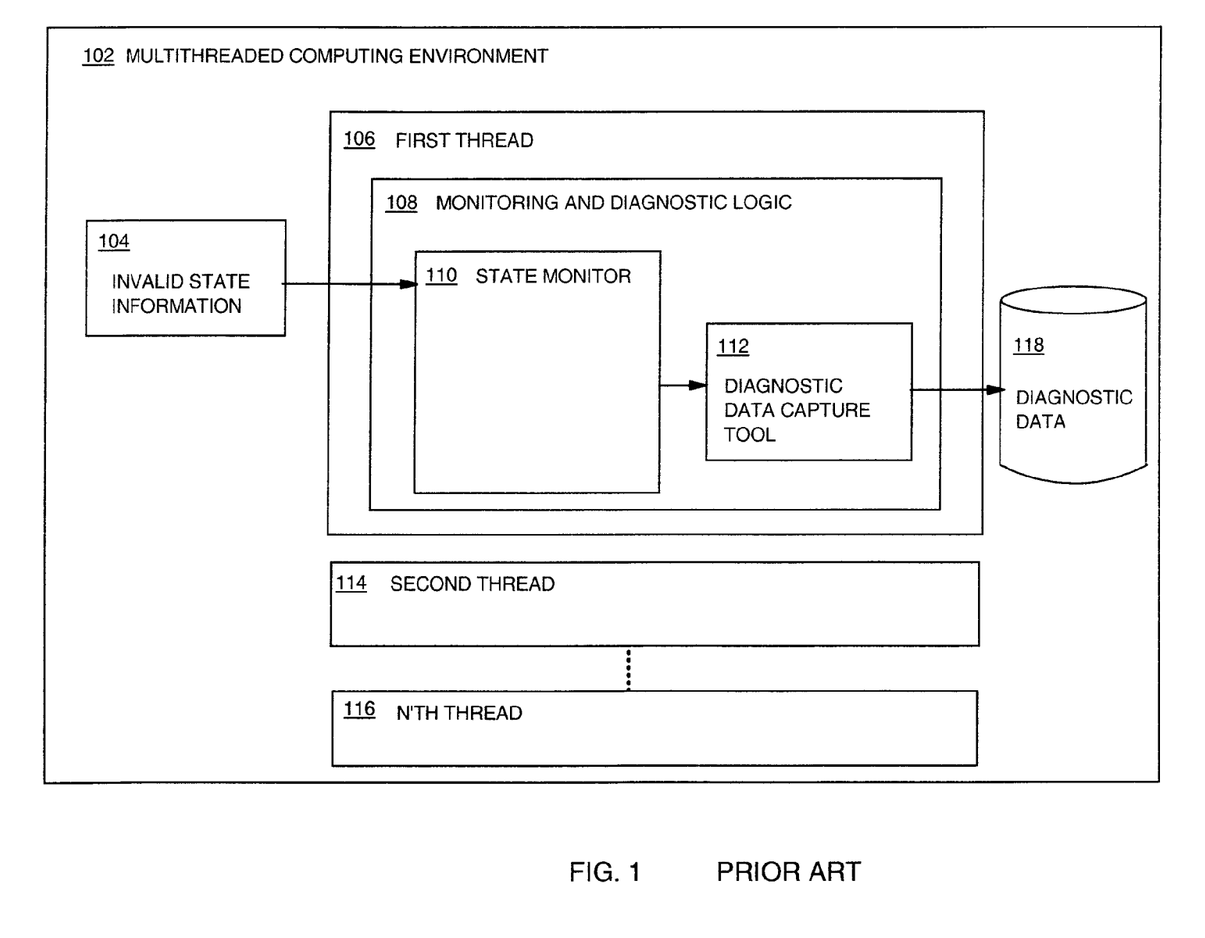
FIG. 1 is a block diagram of a multithreaded computing environment including monitoring and diagnostic logic for the collection of diagnostic data when the multithreaded computing environment is in an invalid state in accordance with the prior art.

FIG. 1 is a block diagram of a multithreaded computing environment 102 including monitoring and diagnostic logic 108 for the collection of diagnostic data 118 when the multithreaded computing environment is in an invalid state in accordance with the prior art. The multithreaded computing environment 102 includes multiple software threads 106, 114, 116. Each thread is a separate stream of software execution and includes software instructions. Threads 106, 114, 116 can also include thread data normally stored in an area of storage in a computer system known as a memory stack. Threads 106, 114 and 116 execute substantially contemporaneously in one or more computer systems such as a multiprocessor computer system, a system including a plurality of sub-processors for the execution of multiple software instructions at the same time (such as a multi-core processor), or a computing environment having multiple computer systems communicatively connected for the execution of one or more software applications. Alternatively, threads 106, 114 and 116 can execute within a single processor on a multiplexed or channelled basis such that the single processor is shared between the multiple threads such that the threads can execute substantially concurrently while individual instructions are processed one at a time. For example, a processing unit can divide its processing between the multiple threads on a round robin, time shared or priority driven basis.

First thread 106 includes the execution of monitoring and diagnostic logic 108 which monitors the execution of all or part of the computing environment 102 for problematic states of operation that correspond to invalid states. The first thread 106 can be dedicated to the monitoring and diagnostic logic 108. Alternatively, the monitoring and diagnostic logic 108 can executed as part of thread 106 that is also used for the execution of other software operations, such as software application operations. For example, the monitoring and diagnostic logic 108 can be executed periodically according to a predetermined schedule or when conditions in the computing environment allow, such as when workload of the environment is sufficiently heavy or light.

The monitoring and diagnostic logic 108 includes a state monitor 110 which is a software routine for monitoring the execution of software operations in threads 106, 114 and 116 to identify an invalid state. Further, the state monitor 110 monitors one or more data stores (not illustrated) for the computing environment 102, such as volatile or non-volatile memories associated with the computing environment 102 for invalid data states. For example, such memories can include one or more memory heaps for the computing environment 102.

In this way, the state monitor 110 is able to determine invalid states falling into two general categories: invalid states indicated by the contents of data in a data store of the computing environment, such as data that appears corrupt or incomplete; and invalid states indicated by a sequence of events taking place in the computing environment 102, such as processing actions taking place in one or more threads in the computing environment 102 that are erroneous or indicative of an erroneous state.

The state monitor 110 identifies an invalid state of the computing environment 102 with reference to predetermined invalid state information 104 which provides a definition of rules, criteria or characteristics of invalid states for the computing environment 102. Invalid state information 104 can be stored in a memory of the computing environment, such as a volatile or non-volatile storage, a heap memory, disk or tape, flash memory or any other suitable memory. The invalid state information 104 can be organised in a structured data format, such as a data structure, or alternatively in a format that can be parsed such as XML or other semantic data format. Additionally the invalid state information 104 can be stored in a database.

The invalid state information 104 is suitable for assisting the state monitor 110 in identifying invalid states of the computing environment 102 in the two general categories of invalid state described above. For example, an invalid state indicated by the contents of data in a data store of the computing environment 102 can be represented in invalid state information 104 as a set of criteria characterising invalid data. An invalid reference (such as a pointer) may include a memory address that is outside an addressable range or that indicates a memory location within a secure or protected range of memory that is not, or should not be, directly addressable. Invalid state information 104 can include indications of invalid memory references such that the state monitor 110 can identify such invalid memory references in a data store of the computing environment 102 to identify an invalid data state.

In a second example, an invalid state arising due to a counter data item exceeding a predetermined threshold can be represented in invalid state information 104 by identifying the valid range or maximum or minimum values of the counter such that the state monitor 110 can identify invalid counter values in a data store of the computing environment 102 to identify an invalid data state.

In a third example, an invalid state arising due to a sequence of events involving the execution of error or exception handling or catching operations can be represented in invalid state information 104 such that the state monitor 110 can identify sequences of events involving such operations to identify an invalid state (such as corresponding to an error or exception state) in the computing environment 102.

Monitoring and diagnostic logic 108 further includes diagnostic data capture tool 112 adapted to capture diagnostic data 118 in response to a determination by the state monitor 110 that the multithreaded computing environment 102 is in an invalid state. The diagnostic data capture tool 112 receives, reads or determines diagnostic data from the computing environment 102 including data stored and threads executing in the computing environment 102. For example, diagnostic data can be read as data state recorded in a memory of the computing environment 102, or can be received from threads in response to requests for data made by the diagnostic data capture tool 112, or can be determined by the diagnostic data capture tool 112 on the basis of data available, readable or receivable by the tool. Information recorded by the diagnostic data capture tool 112 as diagnostic data 118 can include: data dumps such as memory dumps including stack, heap and other memory dumps; stack trace information; thread information including thread data dumps, recording thread state information; process and resource information including memory, disk, peripheral state information and other information as will be known to those skilled in the art. The diagnostic data 118 is recorded to a data store such as a suitable non-volatile or volatile memory or storage device.

Thus, in the prior art arrangement depicted in FIG. 1, monitoring and diagnostic logic 108 monitors, by state monitor 110, the state of the computing environment 102 including stored data and operations occurring in threads 106, 114 and 116 to identify an invalid state in accordance with invalid state information 104. When the state monitor 110 identifies an invalid state the diagnostic data capture tool 112 receives, reads or determines diagnostic data in the computing environment and stores the diagnostic data to a diagnostic data store 118. In the prior art arrangement of FIG. 1 it is not possible to capture diagnostic data for invalid states of a computing environment without the potential to also capturing diagnostic data due to valid transient changes in the environment's state, and so incur a performance degradation arising from the unnecessary collection of diagnostic data. In particular, transient changes in the environment's state can take place in one or both of threads 114 and 116 at the same time as thread 106 is undertaking state monitoring operations.

Preferred embodiments of the present inventions seek to address this problem as set out below with reference to FIGS. 2 to 4.

Figure 2:
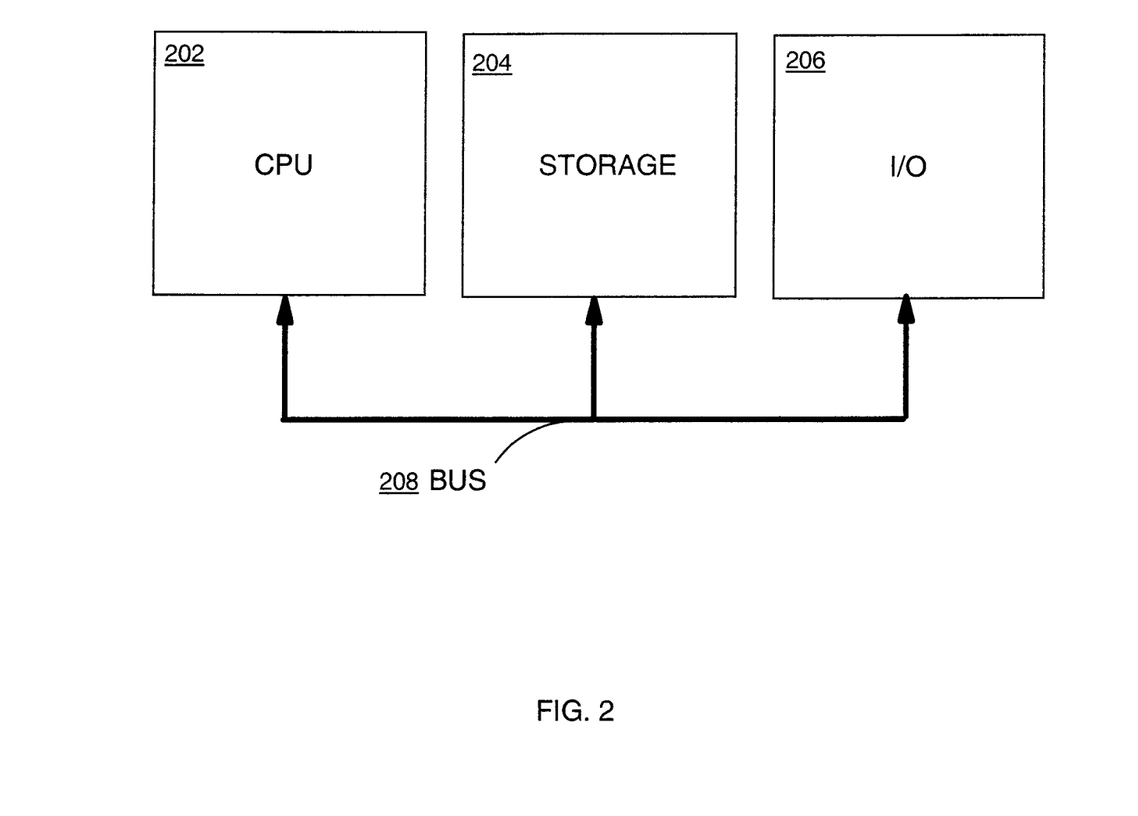
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
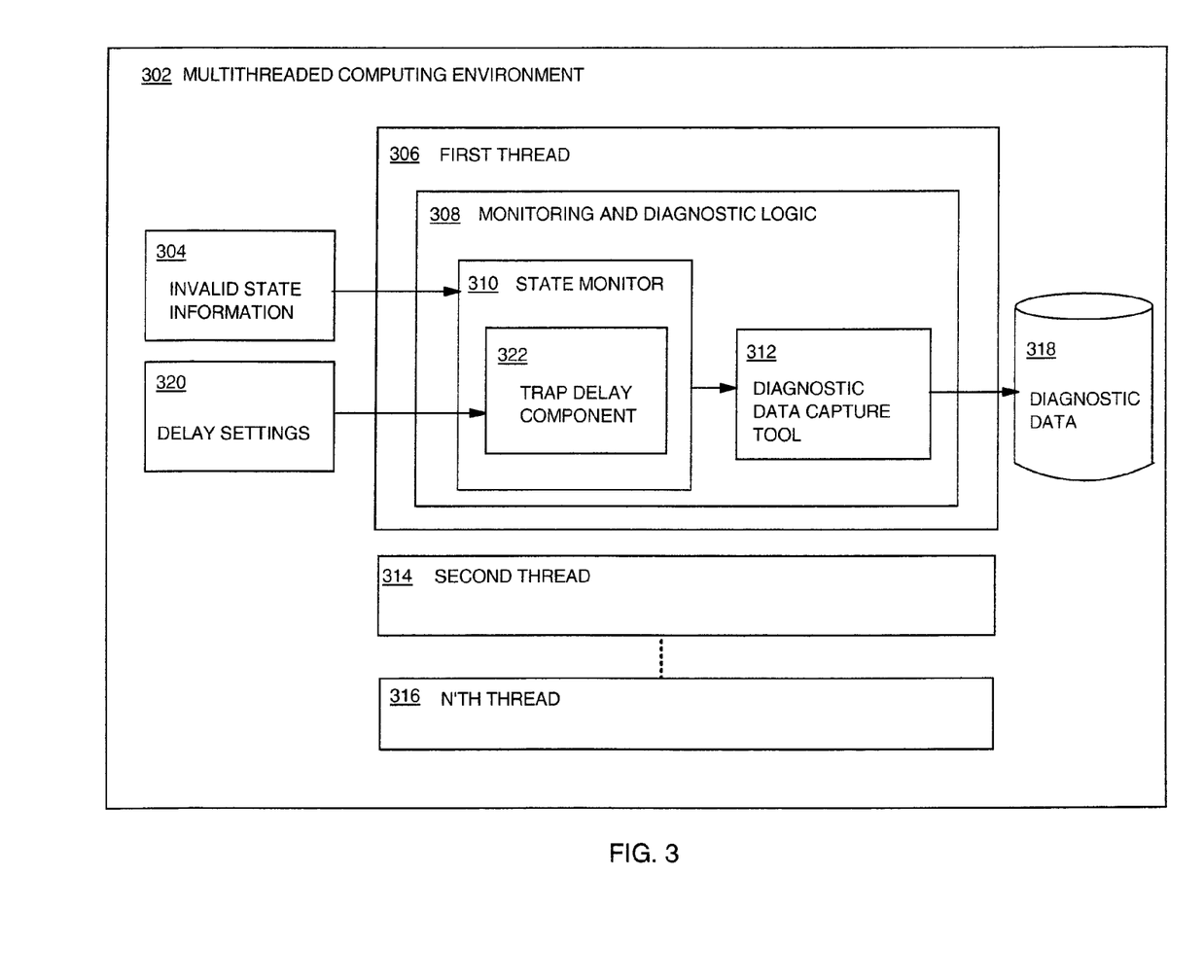
FIG. 3 is a block diagram of a multithreaded computing environment including monitoring and diagnostic logic for the collection of diagnostic data when the multithreaded computing environment is in an invalid state in accordance with a preferred embodiment of the present invention.

FIG. 3 is a block diagram of a multithreaded computing environment 302 including monitoring and diagnostic logic 308 for the collection of diagnostic data 318 when the multithreaded computing environment is in an invalid state in accordance with a preferred embodiment of the present invention. Many of the elements of FIG. 3 are identical to those described above with respect to FIG. 1 and the description of these will not be repeated here. The monitoring and diagnostic logic 308 of FIG. 3 further includes trap delay component 322 for delaying the execution of diagnostic data capture tool 312 until an invalid state identified by the state monitor 310 is identified as corresponding to a state other than a transient state of the computing environment 302. A transient state arises due to a transition of the computing environment 302 by threads from a first valid state to a second valid state. Such a transition will be caused by threads other than the first thread 306 that execute at the same time as the first thread 306 when the first thread 306 is undertaking monitoring and diagnostic operations. A valid state is a state that could not be determined to be an invalid state with reference to the invalid state definitions in the invalid state information 304. An invalid state detected by the state monitor 310 can be an invalid state and a transient state because, in multithreaded computing environment 302, other threads executing concurrently with the thread 306 of the monitoring and diagnostic logic 308 can affect the state of the environment 302 while the monitoring and diagnostic logic 308 is executing.

Examples of invalid states that arise due to a transition from a first valid state to a second valid state and so constitute an invalid but transient state include:

1. The addition of an item to a linked list data structure where a newly created list item contains uninitialized (and consequently invalid) memory references (pointers). While the memory references are uninitialized the computing environment 302 is in an invalid state. However, the invalid state arises between the valid state before the new list entry is created and the valid state when the new list entry is properly integrated into the linked list data structure. Thus, the invalid state constitutes a transient state between two valid states.

2. The incrementing of a counter which causes the counter to exceed a predetermined threshold. While the counter exceeds the threshold the computing environment 302 is in an invalid state. However, the invalid state arises between the valid state of the counter before incrementing and the valid state after software detects that the counter exceeds the threshold and resets the counter. Thus, the invalid state constitutes a transient state between two valid states.

3. A sequence of software operations that correspond to catching an exception where an exception handler is implemented to retry a failed operation which subsequently succeeds. At the moment the exception handler is entered the computing environment is in an invalid state (an exception state). However, the invalid state arises between a valid state before the exception and a valid state after processing the exception handler to retry the operation to achieve success. Thus, the invalid state constitutes a transient state between two valid states.

Additional scenarios where an invalid state arises as a mere consequence of normal processing during a transient state between two valid states will be apparent to the person skilled in the art.

The trap delay component 322 performs trap delay with reference to delay settings 320. The delay settings 320 may include time-specific, count-specific and thread-specific settings, and are accordingly suitable for causing a sufficient delay in the execution of diagnostic data capture tool 312 to ensure that an invalid state identified by the state monitor 310 is not, or is not likely to be, a transient state. In one embodiment, for example, the delay in execution of diagnostic data capture tool 312 involves delaying while thread-specific timestamped monitoring or tracing records are accumulated, indicating that the invalid state is more than merely a transient state caused by another executing thread. The delay settings 320 can include, for example, counts of invalid state trace entries over a time period for a specific thread. The delay settings 320 are illustrated as being stored outside the monitoring and diagnostic logic 308 but it will be apparent to those skilled in the art that these rules can be stored in any suitable location and form for use by the trap delay component 322, such as in a database, a volatile or non-volatile memory of the computing environment 302, in thread data for the first thread 306, within the invalid state verifier 322 or any other suitable storage location.

Thus, in use, the state monitor 310 identifies an invalid state of the computing environment 302 by reference to the invalid state information 304 and causes trap delay component 322 to delay execution of diagnostic data capture tool 312 until such time as it is verified that the invalid state is not a transient state using the delay settings 320. Where the invalid state is confirmed to be a state other than a transient state after the execution of trap delay component 322, the diagnostic data capture tool 312 captures diagnostic data 318 as described above. In this way, the monitoring and diagnostic logic 308 captures diagnostic data 318 when the state of the computing environment 302 is an invalid state but not when the state is a transient state between valid states.

Figure 4:
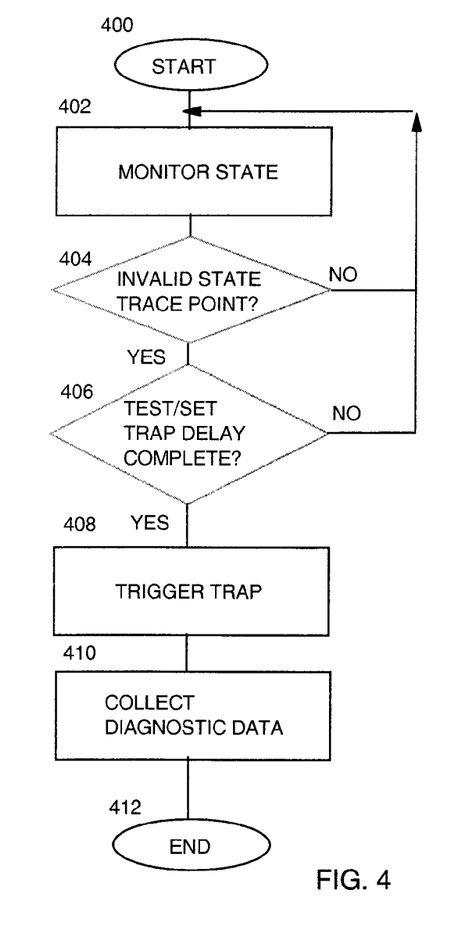
FIG. 4 is a flowchart of the operation of the monitoring and diagnostic logic of FIG. 3 in accordance with a preferred embodiment of the present invention.

FIG. 4 is a flowchart of the operation of the monitoring and diagnostic logic 308 of FIG. 3 in accordance with a preferred embodiment of the present invention. The logic start point is at START step 400. At step 402 the state monitor 310 monitors the state of the computing environment 302. At step 404 the state monitor 310 identifies that an invalid state may exist, with reference to invalid state information 304, and initiates at step 406 trap delay component 322. Trap delay component 322 acts upon delay settings 320 to delay execution of diagnostic data capture component 312 by iteration of steps 402, 404, 406 until, for example, the state monitor 310 has accumulated multiple indicators of invalid state for the thread over a period of time or for a total count of occurrences set in delay settings 320.

If, at step 406, the state monitor 310 has accumulated multiple indicators of invalid state for the thread over a period of time or for a total count of occurrences set in delay settings 320, the system has evidence that the invalid state corresponds to a state other than a transient state of the computing environment 302, and causes execution of the diagnostic data capture tool 312 at step 408 to generate diagnostic data at step 410. The logic ends at END step 412.

It will be clear to one of ordinary skill in the art that all or part of the method of the preferred embodiments of the present invention may suitably and usefully be embodied in a logic apparatus, or a plurality of logic apparatus, including logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus including logic elements to perform the steps of the method, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software miming on one or more processors (not shown in the figures), and that the software may be provided in the form of one or more computer program elements carried on any suitable data-carrier (also not shown in the figures) such as a magnetic or optical disk or the like. Channels for the transmission of data may likewise include storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may include a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service including steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, the functional data including functional computer data structures to, when loaded into a computer system and operated upon thereby, enable the computer system to perform all the steps of the method.

It will be clear to one skilled in the art that many improvements and modifications can be made to the foregoing exemplary embodiment without departing from the scope of the present invention.

The invention claimed is:

1. A method for operating a multithreaded computing environment for capturing diagnostic data, the method comprising:
    in response to a monitor determining that the computing environment is in a predetermined invalid state, initiating a trap delay component having a delay threshold; and
    recording, by a first thread, diagnostic data for the computing environment;
    wherein the trap delay component delays said recording diagnostic data until said monitor determines that said predetermined invalid state has been repeated for at least one of a total count or a period corresponding to a predetermined indicator that it is a state other than a transient state of the computing environment, the transient state corresponding to a transition of the computing environment by one or more other threads from a first valid state to a second valid state.

2. The method of claim 1 wherein the predetermined invalid state is indicated by the contents of data in a data store of the computing environment.

3. The method of claim 2, wherein the contents of data in a data store is corrupt.

4. The method of claim 2 wherein the contents of data in a data store is incomplete.

5. The method of claim 1 wherein the invalid state is indicated by a sequence of events taking place in the computing environment.

6. The method of claim 5 wherein the sequence of events correspond to processing actions taking place in one or more threads in the computing environment.

7. The method of claim 1, further comprising setting said predetermined indicator to a total count of occurrences of said predetermined invalid state.

8. The method of claim 1, further comprising setting said predetermined indicator to a period of time to monitor occurrences of said predetermined invalid state.

9. Apparatus in a multithreaded computing environment for capturing diagnostic data, comprising:
    means responsive to a monitor for determining that the computing environment is in a predetermined invalid state for initiating a trap delay component having a delay threshold; and
    means for recording, by a first thread, diagnostic data for the computing environment;
    wherein the trap delay component delays operation of said means for recording diagnostic data until said monitor determines that said predetermined invalid state has been repeated for at least one of a total count or a period corresponding to a predetermined indicator that it is a state other than a transient state of the computing environment, the transient state corresponding to a transition of the computing environment by one or more other threads from a first valid state to a second valid state.

10. A computer program product for operating a multithreaded computing environment for capturing diagnostic data, the computer program product comprising:
    a non-transitory computer readable storage medium having computer readable program code embodied therewith, the computer readable program code comprising:
    computer readable program code configured for: in response to a monitor determining that the computing environment is in a predetermined invalid state, initiating a trap delay component having a delay threshold; and
    recording, by a first thread, diagnostic data for the computing environment;
    wherein the trap delay component delays said recording diagnostic data until said monitor determines that said predetermined invalid state has been repeated for at least one of a total count or a period corresponding to a predetermined indicator that it is a state other than a transient state of the computing environment, the transient state corresponding to a transition of the computing environment by one or more other threads from a first valid state to a second valid state.

11. The computer program product of claim 10 wherein the predetermined invalid state is indicated by the contents of data in a data store of the computing environment.

12. The computer program product of claim 11, wherein the contents of data in a data store is corrupt.

13. The computer program product of claim 11 wherein the contents of data in a data store is incomplete.

14. The computer program product of claim 10 wherein the invalid state is indicated by a sequence of events taking place in the computing environment.

15. The computer program product of claim 14 wherein the sequence of events correspond to processing actions taking place in one or more threads in the computing environment.

16. The computer program product of claim 10, further comprising setting said predetermined indicator to a total count of occurrences of said predetermined invalid state.

17. The computer program product of claim 10, further comprising setting said predetermined indicator to a period of time to monitor occurrences of said predetermined invalid state.

* * * * *